[19] United States Patent
Beattie

[11] 4,363,975
[45] Dec. 14, 1982

[54] DIRECT CURRENT POWER SUPPLY

[75] Inventor: Jay E. Beattie, Indian Head, Canada

[73] Assignee: Saskatchewan Power Corporation, Regina, Canada

[21] Appl. No.: 264,068

[22] Filed: May 18, 1981

[30] Foreign Application Priority Data

May 30, 1980 [CA] Canada ................................. 353231

[51] Int. Cl.³ .............................................. H02J 3/00
[52] U.S. Cl. ..................................... 307/150; 363/125
[58] Field of Search ...................... 307/107, 150, 151; 363/35, 51, 125, 126, 128

[56] References Cited

U.S. PATENT DOCUMENTS 2,895,059 7/1959 Bell ................................. 307/150 X
3,259,762 7/1966 Skuderna ........................ 361/107 X

FOREIGN PATENT DOCUMENTS 1513291 11/1969 Fed. Rep. of Germany ...... 363/125

OTHER PUBLICATIONS

IBM Technical Disclosure Bulletin, "High Voltage Regulation With Low-Voltage Transistors", J. W. Haskell, vol. 12, No. 11, Apr. 1970, pp. 1997-1998.

Primary Examiner—William M. Shoop
Attorney, Agent, or Firm—Chernoff & Vilhauer

[57] ABSTRACT

A direct current power supply for receiving power input from a high voltage transmission line and providing direct current power to an electrical load operated at or near the potential of the transmission line and remote from electrical ground is disclosed.

17 Claims, 6 Drawing Figures

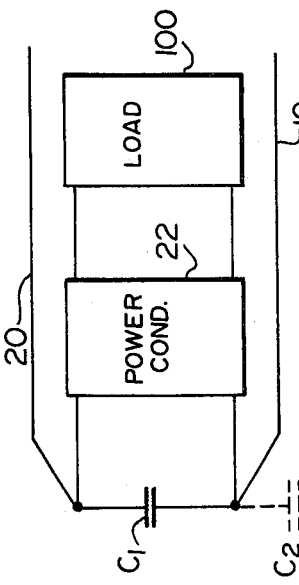
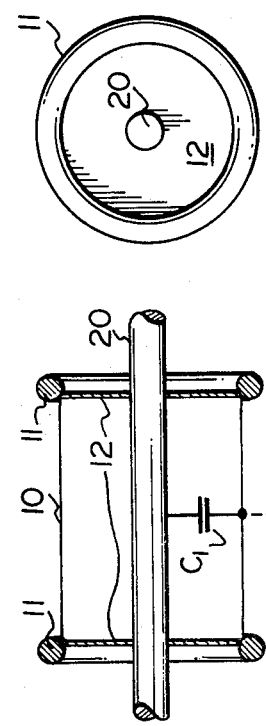
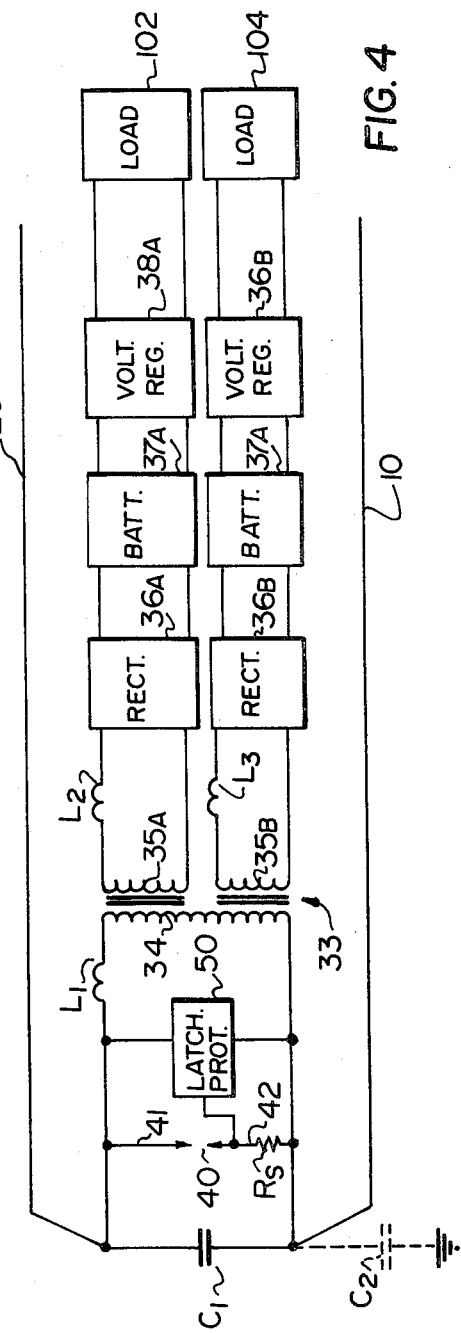

DIRECT CURRENT POWER SUPPLY

FIELD TO WHICH THE INVENTION RELATES

This invention relates to power supplies for receiving power input from a high voltage transmission line and providing direct current power output to an electrical load operated at or near the potential of the transmission line.

BACKGROUND OF THE INVENTION

There are various ways in which power can be supplied to an electrical load operated at or near the potential of a high voltage transmission line. For example, a battery alone might be used, but the battery charge can eventually be depleted to the point where the battery would have to replaced or recharged. Also, power might be supplied from a power supply operated at or near electrical ground potential but, since the power must be delivered to a load operating at or near the potential of the transmission line, expensive means for insulating the load from electrical ground potential is required. Further, the required apparatus can be relatively complex and the lack of electrical decoupling can be disadvantageous.

Alternately, apparatus can be adapted to derive power from the magnetic field surrounding a high voltage transmission line. However, such apparatus would have to be capable of handling current ranging from 0 amps to the maximum currents carried by the transmission line, the latter of which might exceed 2,000 amps in a typical high voltage power system. For such apparatus, no power could be derived in the absence of some minimum current flow in the transmission line, and such minimum current flow might not always be maintained.

U.S. Pat. No. 3,259,762 issued to J. E. Skuderna on July 5, 1966, relates to devices for supplying low voltage power to auxiliary equipment associated with high voltage transmission lines. However, the equipment described is maintained at or near ground potential.

An object of the present invention is to provide a new and improved power supply for supplying power to an electrical load operated at or near the potential of a high voltage transmission line.

A further object of the present invention is to provide apparatus as described which is not overly complex and which does not require costly means to insulate the load from electrical ground by reason of interconnection with the power supply.

SUMMARY OF THE INVENTION

In a broad aspect of the present invention, there is provided a direct current power supply for receiving power input from a high voltage transmission line and providing direct current power output to an electrical load operated at or near the potential of the transmission line remote from electrical ground. The power supply comprises a metallic structure supported in proximity to the transmission line remote from electrical ground. Capacitor means is electrically connected between the transmission line and the metallic structure for providing an alternating current voltage in response to the presence of high voltage on the transmission line. The magnitude of the alternating current voltage developed across the capacitor means is dependent upon the capacitance of the capacitor means and upon stray capacitance between the metallic structure and electrical ground. Power conditioning means is electrically connected to the capacitor means for receiving the alternating current voltage developed across the capacitor means and for converting such voltage into a direct current voltage for the supply of direct current power to the electrical load.

Herein, it is to be understood that the words "transmission line" include busses or other similar high voltage structures.

The metallic structure may take various forms such as a simple conductor or a metallic sheath or metallic mesh. It may be adapted to encircle or partially encircle the transmission line. A structure which is substantially cylindrical in shape and co-axially aligned around the transmission line is preferred. Further, toroidal corona rings capping each end of the cylinder formed by the metallic structure are preferably included to reduce the possibility of unwanted corona discharge. Electrically insulating means may be used for supporting and electrically insulating the metallic structure from the transmission line. Such insulating means may comprise a pair of electrically insulating discs disposed toward opposed ends of the cylinder formed by the metallic structure. Other means such as space bars may also be used.

Where the metallic structure is co-axially aligned around the transmission line, the capacitor means and power conditioning means may be housed within the structure and, with suitable weatherproofing, thereby isolated from the surrounding weather environment. For at least some applications, the electrical load supplied by the power supply may also be housed within the metallic structure.

In a preferred embodiment, the power conditioning means comprises transforming means having a primary winding for receiving alternating current voltage input and at least one secondary winding for providing a corresponding transformed output, the primary winding being in an electrical path connected in electrical parallel with the capacitor means. Rectifying means electrically connected to the transforming means receives the transformed output as an input and provides a corresponding rectified output. Voltage regulating means is electrically connected to the rectifying means for receiving the rectified output as an input and providing a voltage regulated direct current voltage as an output for the supply of direct current power to the electrical load on the power supply. For some applications, the transformer may have a plurality of secondary windings, e.g. in applications where several independent loads are to be powered or where one load has power requirements at more than one voltage level.

The transforming means described above serves to isolate the load (or loads) from the high voltage transmission line and provides a degree of filtering against high voltage transients which may occur on the line. The voltage regulating means substantially smooths voltage ripple at the output of the rectifying means. Advantageously, the voltage regulating means may include a battery which, in addition to providing a filtering and regulating action, can also provide a source of standby power. Preferably, the battery is rechargeable from the power supply itself following power interruptions on the transmission line. To improve ripple filtering, especially when no battery is employed, the voltage regulator may include a filter capacitor at its input.

Advantageously, the power conditioning means may include means for tuning out the capacitive reactance formed by the parallel combination of the capacitor means forming part of the power supply and the stray capacitance between the power supply and ground. As such capacitive reactance is tuned out, power transfer from the transmission line to the electrical load on the power supply is improved. When completely tuned out, series resonance with harmonic alternating current is achieved and power transfer becomes optimal.

Preferably, a power supply in accordance with the present invention will also include protective circuit means for protecting the circuit against overvoltage input conditions. When in use, the power supply may for a variety of reasons be exposed to damaging transient or sustain overvoltages. Transient overvoltage inputs may be suppressed by a transient voltage suppressor such as a spark gap circuit connected between the transmission line and the metallic structure. Overvoltages of longer duration can be bypassed by a normally open latching protector which, upon sensing an overvoltage condition which lasts more than a predetermined amount of time, closes and shorts the metallic structure to the transmission line until reset to the open condition.

One application of the present invention is for the supply of power to current sensing apparatus maintained at or near the potential of a high voltage transmission line. Such apparatus is used to sense and transmit information concerning current in the line to receiving apparatus maintained at or near ground potential. Of course various other applications are possible.

The invention will now be described in more detail with reference to the drawings.

BRIEF DESCRIPTION OF THE DRAWINGS

FIG. 1 is a representational plan view, partially cutaway, showing a portion of a power supply in accordance with the present invention.

FIG. 2 is an end view of the representational power supply shown in FIG. 1.

FIG. 3 is a block-schematic diagram of a power supply in accordance with the present invention shown connected to an arbitrary electrical load.

FIG. 4 is a block-schematic diagram of another power supply in accordance with the present invention shown connected to arbitrary electrical loads.

DETAILED DESCRIPTION

Figure 5:
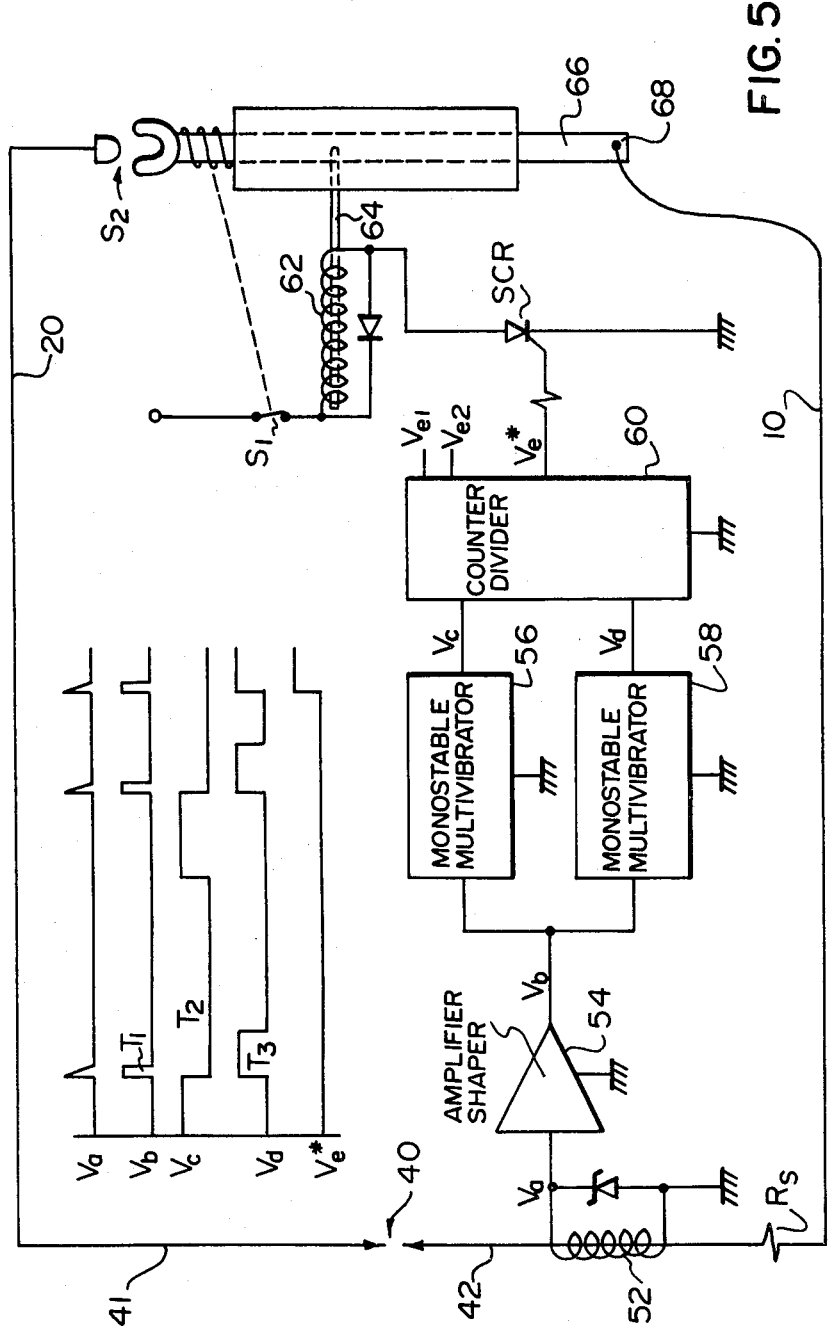
FIG. 5 is a detailed block-schematic diagram of the latching protector shown in FIG. 4, including an inset diagram showing representative waveforms in the operation of the protector.

FIGS. 1 and 2 depict a substantially cylindrical metallic structure or cylinder 10 co-axially aligned around a high voltage transmission line 20. The cylinder may be fabricated from various suitable materials—for example, 16 gage aluminum sheet material closed in the form of a cylinder with bands or clamps.

Toroidal corona rings 11 cap each end of cylinder 10 to reduce the possibility of corona discharge. Such rings may be readily fabricated from flexible stainless steel tubing.

Electrical insulating discs 12 formed from an electricaly non-conducting material (for example, plexiglass) are inserted at each end of the cylinder 10 to support and electrically insulate the cylinder from transmission line 20. As can be seen, each disc 12 has a centrally located aperture through which transmission line 20 extends. A capacitor $C_1$ having a selected capacitance is connected between transmission line 20 and cylinder 10. The value of this capacitance and the value of stray capacitance between cylinder 10 and electrical ground for transmission line 20 together determine the electrical potential which will be present between transmission line 20 and cylinder 10 as a function of the electrical potential between the transmission line and ground. In the figures, such stray capacitance is symbolically represented by capacitor $C_2$ which is shown in broken lines because it is not a physical element per se.

When an alternating current high voltage is present on transmission line 20, current flows through capacitors $C_1$ and $C_2$ to electrical ground. Alternating current voltage develops across capacitor $C_1$ in response to such current flow. As indicated in FIG. 3, a power conditioning means 22 (not shown in FIGS. 1 or 2) receives as an input the voltage so developed. The received input is converted by power conditioning means 22 into a direct current voltage for the supply of direct current power to electrical load 100.

Power conditioning means 22 may be housed within metallic structure 10. Depending upon the nature and function of electrical load 100, it too may be housed within metallic structure 10. (It is to be understood that electrical load 100 is not considered as part of the power supply.)

Figure 6:
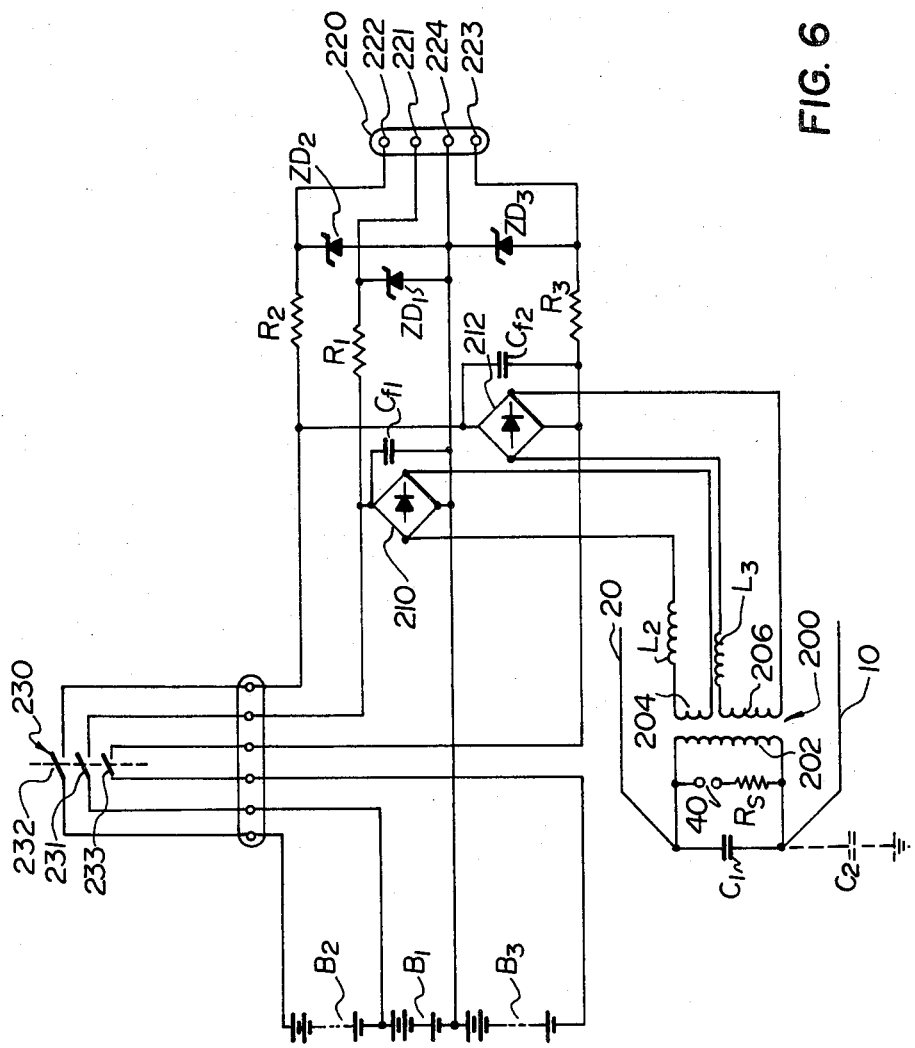
FIG. 6 is a detailed circuit diagram of a power supply in accordance with the present invention.

The design of power conditioning means may vary considerably depending upon the particular application. The design shown in FIG. 3 is highly generalized. FIGS. 4 and 5 show a more specific design. FIG. 6 shows a specific design in relatively high detail.

The power supply of FIG. 4 includes a transformer 33 and two rectifiers 36A, 36B. Rectifier 36A supplies power to an electrical load 102 through voltage regulator 38A. Rectifier 36B supplies power to an electrical load 104 through voltage regulator 38B. Electrical loads 102 and 104 (which are not considered as part of the power supply) are shown as independent loads, but they could be different loads presented by a single loading apparatus which has input power requirements at different voltage levels.

Transformer 33 includes a primary winding 34 and two secondary windings 35A, 35B. Primary winding 34, in series with inductor $L_1$, is connected across capacitor $C_1$. Secondary winding 35A, in series with inductor $L_2$, is connected across the imput of rectifier 36A. Secondary winding 35B, in series with inductor $L_3$, is connected across the input of rectifier 36B.

The purpose of inductors $L_1$, $L_2$ and $L_3$ is to enable maximum power transfer from transmission line 20 to the loads. Generally, the value of stray capacitance $C_2$ between metallic structure 10 and electrical ground will be made as large as possible in order to increase the amount of power which can be derived. This value may be increased by increasing the diameter of metallic structure 10 or by decreasing the clearance distance between the structure and electrical ground. However, the physical space available on a transmission line for a structure such as cylindrical metallic structure 10 will often be limited. Further it has been found that distance from ground does not greatly affect the value of stray capacitance once the distance exceeds a few feet. By reason of such limitations, it may become highly desirable to include means for maximizing power transfer such as inductors $L_1$, $L_2$ and $L_3$.

Inductors $L_1$, $L_2$ and $L_3$ are selected to tune out the capacitive reactance formed by the parallel combination of capacitor $C_1$ and stray capacitance $C_2$. It should be understood that although three inductors are shown in FIG. 4, inductors may be inserted in the transformer secondary circuits only or may be consolidated into a single inductor in the primary circuit. Ultimately, there is an equivalent series inductance between the transmission line power source and the power supply loads. Further, although the inductors in FIG. 4 are shown as discrete elements, they may be formed in whole or in part by leakage inductance built in with the design of the transformer. In any case, the values of inductance required for a given application can be determined using classical circuit analysis techniques. Alternately, a physical model of the circuit can be made and the inductances varied until the average current from the rectifying means or the power input to the power conditioning means is a maximum.

The power supply of FIG. 4 includes two battery packs 37A, 37B. Battery pack 37A is connected between the output of rectifier 36A and voltage regulator 38A; battery pack 37B is connected between the output of rectifier 36B and voltage regulator 38B. Although these battery packs are shown as separate and distinct elements, they may in fact be considered as part of the voltage regulators because they each perform a voltage regulating and filtering action. Typically, the output of rectifiers 36A and 36B will be full wave rectified signals and may include undesirable transient voltages. The battery packs act to substantially remove the ripple component of the rectified signals and, since they exhibit the passive characteristic of a large capacitor, filter and substantially reduce the magnitude of undesirable transient voltages.

During normal operation of the power supply of FIG. 4, battery packs 37A and 37B are effectively float charged from the outputs of rectifiers 36A and 36B respectively. In the event that there is a power failure such that no power is forthcoming from the rectifiers, the battery packs then act as the primary source of power to load 102 and 104 (at least until battery charge is substantially exhausted). Upon restoration of power at the output of the rectifiers, the battery packs return to a standby power and float charge mode.

The power supply of FIG. 4 also includes provision for protection against transient overvoltages and against sustained overvoltages from transmission line 20. A conventional spark gap 40 or other transient voltage suppressor with or without current limiting resistor $R_s$ may be used to protect against transient overvoltages. For protection against overvoltages of longer duration, a latching protector 50 is used. Sustained overvoltages can result from an electrical failure of capacitor $C_2$ or from a failure of one or more connections made to transmission line 20 or to metallic structure 10. Latching protector 50 is normally open but, upon detection of a sustained overvoltage condition, shorts metallic structure 10 to transmission line 20 and maintains the short until manually reset.

Latching protector 50 can take various forms, one of which is shown in FIG. 5. To assist in the description of FIG. 5, a representative waveform diagram has been inset in the upper left side of the FIGURE. When the voltage of transmission line 20 exceeds the rating of spark gap 40, the gap will fire and current (initially limited by the resistance value of resistor $R_s$) will flow from the transmission line to metallic structure 10 through spark gap leads 41, 42. This current is sensed in lead 42 by induction or pickup coil 52 to produce a voltage pulse $V_a$ which is amplified and shaped by amplifier 54 to produce a square wave pulse $V_b$ of relatively short duration $T_1$ (typically of the order of a few microseconds). Pulse $V_b$ triggers two monostable multivibrators 56, 58. Multivibrator 56 generates a window pulse $V_c$ of duration $T_2$ (typically of the order of one second), and multivibrator 58 generates a pulse $V_d$ of duration $T_3$ (typically of the order of a few milliseconds—viz. a "stretched" version of pulse $V_b$). Pulse $V_c$ and $V_d$ are gated in counter/divider 60 which provides an output level $V_{e1}$ if and only if $V_c$ and $V_d$ are present at the same time. If two pulses $V_d$ occur within the duration $T_2$ of pulse $V_c$, then a second parallel output level $V_{e2}$ is available from counter/divider 60. For a counter/divider which incorporates a decade counter, up to ten parallel outputs may be available. One may select one of the ten outputs to provide a trigger level $V_e^*$ for the silicon controlled rectifier SCR. (In the case of FIG. 5, it can be seen from the waveform diagram that the selected output $V_e^*$ actually corresponds to output level $V_{e2}$.) When the SCR is triggered, solenoid 62 is activated thereby releasing latching pin 64 which restrains spring loaded plunger 66. Spring 68 then forces plunger 66 into electrical contact with transmission line 20 at switch $S_2$. Because plunger 66 is also in electrical contact with metallic structure 10 at contact point 68, this action completes a short circuit between transmission line 20 and metallic structure 10. Plunger 66 is mechanically coupled to switch $S_1$ (normally closed) such that switch $S_1$ is opened when the plunger through $S_2$ comes into contact with transmission line 20. This action releases voltage supply (not shown) to the latching protector circuit, and solenoid 62 is de-energized. (Such voltage supply may be provided by a battery.) Reset may then be achieved by manually reloading plunger 66 and reclosing switch $S_1$. Thus, for the circuit represented in FIG. 5, a sustained overvoltage which results in two or more firings of spark gap 40 separated by a predetermined duration of time $T_3$ and within a predetermined duration of time $T_2$, will result in activation of switch $S_2$ with consequent removal of the undesired overvoltage.

FIG. 6 shows a circuit diagram of a power supply designed to supply direct current power to a load having input power requirements at three different operating voltage levels. This power supply includes a transformer 200 having a primary winding 202 and two secondary windings 204, 206. Primary winding 202 is in parallel connection with capacitor $C_1$. Secondary winding 204, in series connection with tuning inductor $L_2$, is connected across the input of bridge rectifier 210. Secondary winding 206, in series connection with tuning inductor $L_3$, is connected across the input of bridge rectifier 212.

The output of bridge rectifier 210 is connected to the input of a first voltage regulator which comprises filter capacitor $C_{f1}$, current limiting resistor $R_1$ and zener diode $ZD_1$. The output of the first voltage regulator is taken across terminals 221 and 224 of connector 220, terminal 224 being taken as ground.

The output of bridge rectifier 212 is divided across the inputs of second and third voltage regulators. The second voltage regulator comprises current limiting resistor $R_2$ and zener diode $ZD_2$. The third voltage regulator comprises current limiting resistor $R_3$ and zener diode $ZD_3$. The output of the second voltage regulator is taken across terminals 222 and 224 of connector 220. The output of the third voltage regulator is taken across terminals 223 and 224 of connector 220.

Filter capacitor $C_{f2}$ in FIG. 6 may be considered as forming part of both the second and the third voltage regulators in that it performs a filtering action across the entire output of rectifier 212.

Remote controlled switch 230 (shown with contacts 231, 232 and 233 in an open position in FIG. 6) enables batteries $B_1$, $B_2$ and $B_3$ to be connected or disconnected from the power supply. In addition to providing regulating and filtering action, the batteries can sustain overall power output for a period of time even though power input from transmission line 20 may be lost. Of course, the length of time during which the batteries can provide such standby power will depend upon their capacity and their initial state of charge at the time power from the transmission line is lost.

The selection of component values in the design of a power supply like that shown in FIG. 6 will of course depend upon transmission line voltage and the voltage and power requirements of the load. The general design indicated has been used to provide approximately 2 watts of direct current power output at approximate voltages of +5.1 volts (terminal 221 to 224), +15 volts (terminal 222 to 224), and −15 volts (terminal 223 to 224) from a 133 $KV_{rms}$ transmission line 20, the power being supplied to an optical current transducer operated near line potential. A cylindrical metallic structure 10 (not shown in FIG. 6) approximately one foot in diameter, two feet in length and capped with six inch toroids approximately two feet in diameter, all mounted on a transmission line 20 located 26 feet above ground was used. The resulting stray capacitance ($C_2$) was approximately 40 pF. The selected value of capacitor $C_1$ was 2200 pF. Transformer 200 was a 3000/30/6 V 200 VA 60 HZ transformer with a 1 in² permalloy-80 C core. Spark gap 40 shown in FIG. 6 was a 6 KV spark gap, and current limiting resistor $R_s$ in series therewith was 1 ohm. Although not shown in FIG. 6 a latching protector as described in relation to FIGS. 4 and 5 was also used. This protector comprised a 3/16" spring loaded brass plunger in a ⅜" cylinder with high voltage cap nut contacts. Batteries $B_1$, $B_2$ and $B_3$ were formed by a 24 cell nickel-cadmium battery pack tapped after 0, 12, 17 and 24 cells, the 12th cell tap being connected directly to terminal 224 as the ground reference.

The invention should not be considered as limited to the specific designs described above. A variety of designs within the scope of the following claims will occur to those skilled in the art.

I claim:

1. A power supply for receiving power input from a high voltage transmission line and providing a direct current power output to an electrical load operated at or near the potential of said transmission line remote from electrical ground, said power supply comprising:
   (a) a metallic structure supported in proximity to said transmission line remote from electrical ground;
   (b) capacitor means electrically connected between said transmission line and said metallic structure for providing in response to the presence of high voltage on said transmission line an alternating current voltage, the magnitude of which alternating current voltage is dependent upon the capacitance of said capacitor means and upon stray capacitance between said metallic structure and electrical ground; and,
   (c) power conditioning means electrically connected to said capacitor means for receiving said alternating current voltage and converting such voltage into a direct current voltage for the supply of direct current power to said electrical load.

2. A power supply as defined in claim 1, wherein said metallic structure is substantially cylindrical in shape and co-axially aligned around said transmission line.

3. A power supply as defined in claim 2, including toroidal corona rings capping each end of the cylinder formed by said metallic structure.

4. A power supply as defined in claim 3, including electrically insulating means for supporting and electrically insulating said metallic structure from said transmission line.

5. A power supply as defined in claim 4, wherein said electrically insulating means comprises a pair of electrically insulating discs disposed towards opposed ends of the cylinder formed by said metallic structure, said transmission line extending through apertures centrally located in said discs.

6. A power supply as defined in claim 2, 3 or 4, wherein said capacitor means and said power conditioning means are housed within the cylinder formed by said metallic structure.

7. A power supply as defined in claim 2, 3 or 4, wherein said capacitor means, said power conditioning means and said electrical load are housed within the cylinder formed by said metallic structure.

8. A power supply as defined in claim 1, 2 or 3, wherein said power conditioning means comprises:
   (a) transforming means having a primary winding for receiving an input and at least one secondary winding for providing a corresponding transformed output, said primary winding being in an electrical path connected in parallel with said capacitor means;
   (b) rectifying means electrically connected to said transforming means for receiving said transformed output as an input and providing a corresponding rectified output; and,
   (c) voltage regulating means electrically connected to said rectifying means for receiving said rectified output as an input and providing voltage regulated direct current power as an output to said electrical load.

9. A power supply as defined in claim 1, 2 or 3, wherein said power conditioning means includes means for tuning out the capacitive reactance formed by the parallel combination of said capacitor means and said stray capacitance to thereby improve power transfer from said transmission line to said electrical load.

10. A power supply as defined in claim 1, 2 or 3, wherein said power conditioning means comprises:
   (a) transforming means having a primary winding for receiving an input and at least one secondary winding for providing a corresponding transformed output, said primary winding being in an electrical path connected in parallel with said capacitor means;
   (b) rectifying means electrically connected to said transforming means for receiving said transformed output as an input and providing a corresponding rectified output;
   (c) voltage regulating means electrically connected to said rectifying means for receiving said rectified output as an input and providing voltage regulated direct current power as an output to said electrical load; and, (d) means for tuning out the capacitive reactance formed by the parallel combination of said capacitor means and said stray capacitance to thereby improve power transfer from said transmission line to said electrical load.

11. A power supply as defined in claim 1, 2 or 3, wherein said power conditioning means comprises:

(a) transforming means having a primary winding for receiving an input and at least one secondary winding for providing a corresponding transformed output, said primary winding being in an electrical path connected in parallel with said capacitor means;

(b) rectifying means electrically connected to said transforming means for receiving said transformed output as an input and providing a corresponding rectified output;

(c) voltage regulating means electrically connected to said rectifying means for receiving said rectified output as an input and providing voltage regulated direct current power as an output to said electrical load; and, (d) an inductor in series connection with one of said transformer windings for tuning out the capacitive reactance formed by the parallel combination of said capacitor means and said stray capacitance to thereby improve power transfer from said transmission line to said electrical load.

12. A power supply as defined in claim 1, 2 or 3, wherein said power conditioning means comprises:

(a) transforming means having a primary winding for receiving an input and at least one secondary winding for providing a corresponding transformed output, said primary winding being in an electrical path connected in parallel with said capacitor means;

(b) rectifying means electrically connected to said transforming means for receiving said transformed output as an input and providing a corresponding rectified output;

(c) voltage regulating means electrically connected to said rectifying means for receiving said rectified output as an input and providing voltage regulated direct current power as an output to said electrical load, said voltage regulating means including a battery for providing a source of standby power as well as voltage regulating and filtering action; and, (d) means for tuning out the capacitive reactance formed by the parallel combination of said capacitor means and said stray capacitance to thereby improve power transfer from said transmission line to said electrical load.

13. A power supply as defined in claim 2, further including protective circuit means for protecting against overvoltage conditions between said transmission line and said metallic structure.

14. A power supply as defined in claim 13, wherein said protective circuit means comprises a transient voltage suppressor for forming a transient low resistance conducting path between said transmission line and said metallic structure in response to a transient overvoltage condition between said transmission line and said metallic structure.

15. A power supply as defined in claim 14, wherein said protective circuit means further comprises a normally open latching protector, said normally open latching protector for closing upon the occurrence of a sustained overvoltage condition between said transmission line and said metallic structure which lasts longer than a predetermined amount of time, and thereby forming a sustained low resistance conducting path between said transmission line and said metallic structure until reset to said normally open condition.

16. A power supply as defined in claim 15, wherein the input to said latching protector for detecting the occurrence of a sustained overvoltage condition is taken from an induction coil surrounding said low resistance conducting path formed by said transient voltage suppressor.

17. A power supply as defined in claim 14, 15 or 16, wherein said transient voltage suppressor comprises a spark gap and a current limiting resistor connected in series therewith.

* * * * *